April 24, 1962 F. R. STEUART 3,030,727
ICE FISHERMAN'S ANGLING HOLE PLUG
Filed Oct. 2, 1958
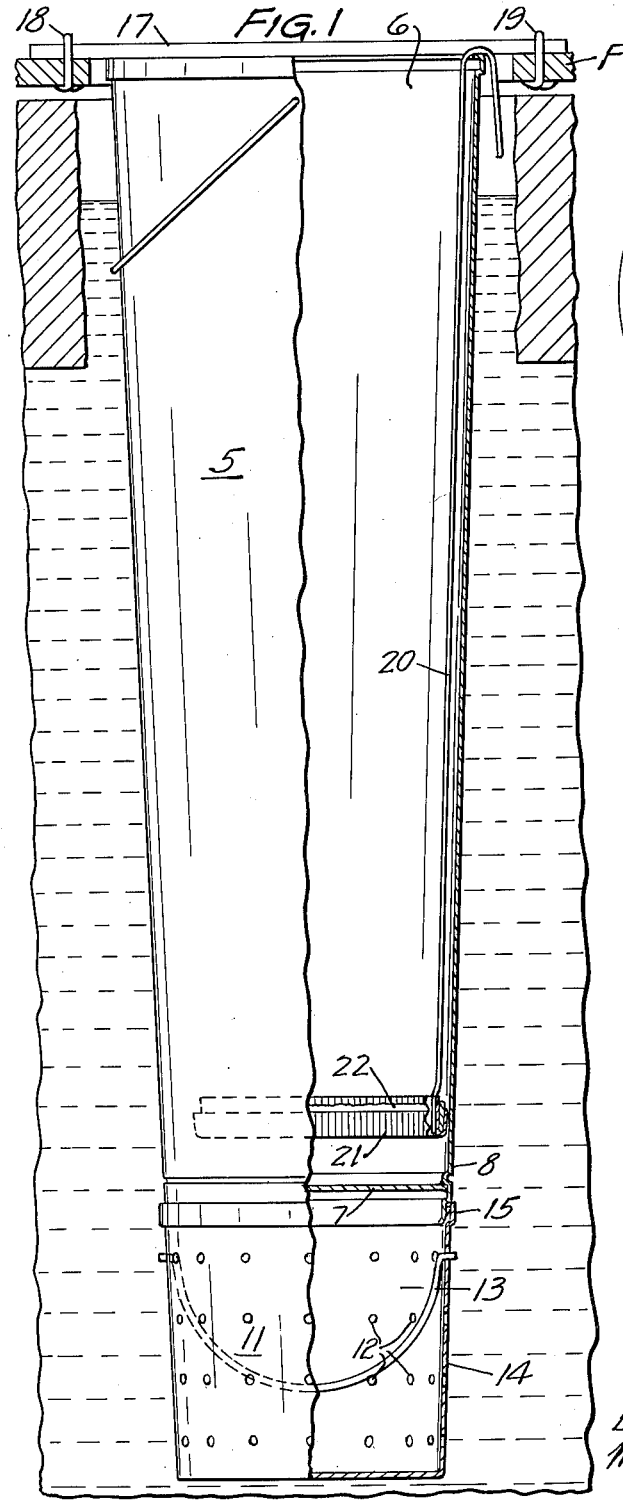
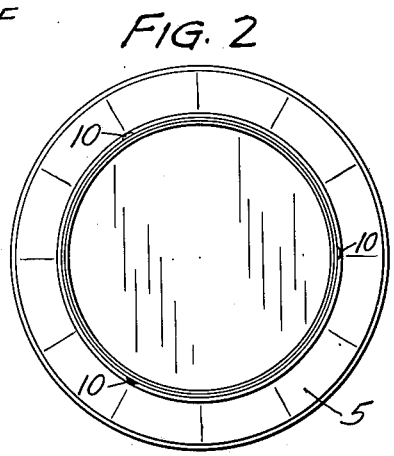
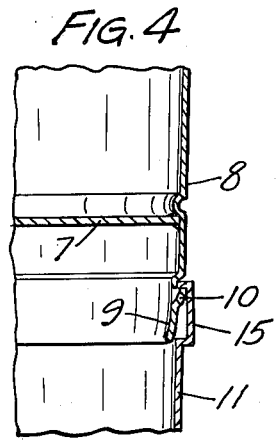
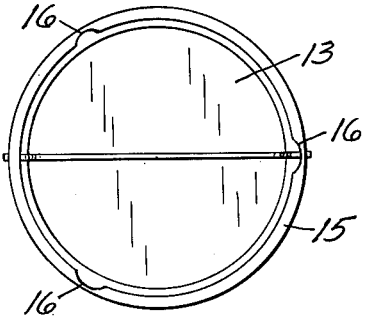
INVENTOR
FRANK R. STEUART
BY
Williamson, Schroeder & Palmatier
ATTORNEYS

United States Patent Office 3,030,727
Patented Apr. 24, 1962

3,030,727
ICE FISHERMAN'S ANGLING HOLE PLUG
Frank R. Steuart, Henning, Minn.
Filed Oct. 2, 1958, Ser. No. 764,806
3 Claims. (Cl. 43—56)

This invention relates to angling hole plugs for ice fishermen. More particularly, it relates to devices designed to maintain an angling hole for an ice fisherman in an open condition even though the ice hole is left unattended over a long period of time.

The sport of angling for fish through a hole in the ice has grown substantially in popularity in recent years. Although not all, most of this angling is done from within fish houses, the interior of which is lighted. Such fishermen, however, encounter two main difficulties in enjoying their angling sport. One of these difficulties is that each time after completing their fishing, the ice will freeze over their angling hole before they return to again use the same. This means that each time they want to enjoy the sport of angling through the ice, they must first engage in considerable labor in chopping a new hole through the ice, which in some of the more northern areas reaches a very substantial thickness. The second difficulty involved in angling through the ice is the problem of preserving the minnows used in angling for future use after the fisherman has completed his first angling expedition. The number of minnows which are used by an ice fisherman in a single day of angling are relatively small. For example, several dozen minnows will last the average ice fisherman for quite an extended period, provided these minnows will survive. Thus, if he maintains the minnows in an alive and active condition from one angling operation to another, he may have sufficient minnows for a great deal of fishing upon quite a number of different occasions. Since the average fisherman has no place to preserve his minnows during the period between fishing operations, his minnows more often than not fail to survive from one angling operation to the next. Consequently, the fisherman must purchase new minnows each time he wishes to fish. Since retailers of minnows generally sell the same in relatively large quantities, there is substantial waste involved for the average fisherman each time he goes fishing, for each time he must purchase a fresh supply of minnows which is substantially larger in numbers of minnows than he actually needs. My invention is designed to simultaneously overcome both of those difficulties and at the same time provide a practical and efficient minnow bucket for the minnows during the fishing operation.

This invention is an improvement over my previous invention as disclosed and claimed in my co-pending application Serial Number 709,915, filed January 20, 1958, which issued as Patent No. 2,877,595 and which is entitled "Ice Fisherman's Angling Hole Plug." My present invention has a number of distinctive advantages over the invention disclosed and claimed in this co-pending application.

It is a general object of my invention to provide a novel and improved ice hole plug which is both simple and inexpensive to manufacture and use.

A more specific object is to provide a novel and improved ice hole plug which enables a fisherman to maintain his fishing hole in an open condition over prolonged periods of absence or unattendance and which can easily and readily be removed from the ice and thereafter be modified through simple manipulation to convert into a minnow bucket.

Another object is to provide a novel and improved ice hole plug which will enable a fisherman to maintain his ice fishing hole in open condition over prolonged periods of absence or unattendance which will at the same time enable him to preserve his minnows over the same periods of time and repeatedly from one fishing period to another and which will dismantle and the parts of which will nest to provide an effective minnow bucket for use during the fishing operations.

Another object is to provide a novel and improved ice hole plug which will enable a fisherman to maintain his ice fishing hole in open condition over prolonged periods of absence or unattendance, the lower section of which is detachable and adapted to retain minnows therein in an active and alive condition at a level beneath the ice while the upper section functions as a plug and which lower section is capable of nesting within the upper section to cooperatively form an effective minnow bucket.

These and other objects and advantages of our invention will more fully appear from the following description, made in connection with the accompanying drawings wherein like reference characters refer to the same parts throughout the several views and in which:

FIG. 1 is an elevational view partly in section showing an embodiment of my invention being in position and being utilized within an angling hole in the ice to maintain the hole in open condition and simultaneously preserve the fisherman's minnows;

FIG. 2 is a bottom elevational view of the upper section of my ice hole plug;

FIG. 3 is a top elevational view of the lower section of my ice hole plug and;

FIG. 4 is a fragmentary sectional view of an enlarged scale showing the manner in which the upper and lower sections of the ice hole plug cooperatively engage each other when in use as an ice hole plug.

One embodiment of my invention may include as shown in FIGS. 1-4, a frusto-conically shaped container 5 made of metal and having an open upper end portion as at 6. The lower end of the container 5 is closed with a bottom panel 7 which is welded or otherwise secured in the lower end portion 8 of the container 5 as best shown in FIG. 4. An annular flange 9 depends from the bottom panel 7 as best shown in FIGS. 1 and 4 and is provided with a plurality of outwardly extending locking elements 10 as best shown in FIG. 4. These locking elements are formed out of the material of the flange 9 by cutting the same at circumferentially spaced points and forcing the material outwardly to form the locking elements. It will be noted that the container 5 is imperforate.

A second but perforate container 11 is removably secured to the lower end portion of the container 5. This perforated container 11 has a plurality of apertures 12 formed through its walls and has an open upper end portion as at 13. The apertures 12 are sufficiently small to prevent the passage of minnows therethrough, but also sufficiently large to permit free circulation of water through the container 11 when the latter is immersed.

The upper end portion 14 of the container 11 is formed into a channel indicated by the numeral 15. This channel 15 faces inwardly and has a plurality of passageways indicated by the numeral 16 cut in the upper side wall of the channel. Passageways 16 are positioned and arranged so that the locking elements 10 may be simultaneously moved downwardly therethrough and into the channel 15 so that upon relative rotation of either of the containers about its longitudinal axis, the locking elements 10 and the channel 15 will cooperatively secure the two containers 5 and 11 to each other. It will be seen by reference to FIG. 1 that the diameter of the lower end of the container 5 is slightly smaller than the diameter of the open upper end of the container 11 so that the former may extend downwardly into the latter to permit the cooperatively locking action described above. When the two containers 5 and 11 are so secured to each other, the bottom panel 7 functions as a closure for the otherwise open upper end 13 of container 11 whereby the escape of minnows through the upper end is prevented.

In use my ice hole plug will be assembled as shown in FIG. 1, the minnows to be kept alive having first been placed within the container 11. The conected containers 5 and 11 are then inserted in the hole in the ice as shown in FIG. 1, the imperforate feature of the container 5 preventing water from entering the same and being consequently strongly urged upwardly as a result of the displacement of the water. The assembled ice plug comprised of the containers 5 and 11 may be secured in this position by merely passing a pipe 17 across the top of the container 5 and securing the same by a pair of loops 18 and 19 which are attached to the floor F of the fish house. When left in this position the water in the hole will freeze firmly around the container 5 while the container 11 will be held at a sufficiently low level so that the water therein will remain in a liquid state. After the container 5 has frozen in this position the pipe 17 can be easily withdrawn.

To remove the ice hole plug, the pipe 17 is first withdrawn and rod 20 having a channel shaped loop 21 at its lower end is inserted into the container 5 as shown in FIG. 1. The channel shaped loop 21 preferably carries a wick 22 which is soaked prior to insertion in alcohol or other highly flamable liquid. When the wick 22 is lighted, the heat therefrom will quickly be transmitted to the metal walls of container 5 whereupon the ice in contact with the exterior of the container 5 will be melted and the containers 5 and 11 will pop upwardly. The ice hole plug can in this manner be easily removed and withdrawn. Upon withdrawal of the two containers 5 and 11, the one may be twisted relative to the other as herein before described until the locking elements are opposite the passageway 16 so that the two containers may be detached.

The two containers 5 and 11, after having been disconnected may be used to cooperatively form a minnow bucket in which to preserve the minnows in an alive and active condition. This is accomplished by merely filling the lower end portion of the container 5 with water and lowering container 11 and the minnows therewithin into the container 5 until the container 11 rests upon the bottom 7 of the container 5. It will be noted that the container 11 is also frusto-conically shaped in that it tapers inwardly and downwardly just as the container 5 does. It is possible thereafter for the container 11 to nest within the lower end portion of the container 5. The level of the water in the container 5 should, of course, be such as to be lower than the upper end portion of the container 11 when the latter is deposited within the container 5. In this manner, the two containers cooperatively form an effective and efficient minnow bucket.

When the fishing operation is complete, the container 11 may be removed from the container 5, the water poured out of container 5, the lower end portion of container 5 connected to the upward end portion of the container 11 and the entire structure then placed within the hole in the ice as shown in FIG. 1 to again function effectively as an ice hole plug.

From the above, it can be seen that I have provided a simple and inexpensive device which simultaneously overcomes the two major problems of ice angling which tend to discourage fishermen from doing more of the same and to lessen the enjoyment of those who do participate in this sport. It is deemed obvious that this device can be manufactured very inexpensively and that it is simple to utilize. In addition it will be noted that this device provides an added advantage in that the sections thereof can be utilized cooperatively to form a highly satisfactory minnow bucket.

It will, of course, be understood that various changes may be made in the form, details, arrangement and proportions of the parts without departing from the scope of my invention which consists of the matter shown and described herein and set forth in the appended claims.

What is claimed is:

1. An ice hole plug comprising an elongated frusto-conically shaped imperforate container having a closed lower end portion with a bottom and an open upper end portion, said container tapering inwardly and downwardly, a perforate container having an open upper end portion, and means carried by said containers for releasably securing said containers together with the lower end portion of said imperforate container across the upper end portion of said perforate container in closing relation to the latter, the perforations in said perforate container being sufficiently small to prevent minnows from passing therethrough whereby minnows may be kept alive within said perforate container when the latter is so secured to said imperforate container while the latter is used as a plug in a hole in the ice covering a body of water, said perforate container diminishing in diameter from its upper end toward its lower end and being capable of nesting within the interior of the lower end portion of said imperforate container and cooperatively functioning therewith when so nested as a minnow bucket.

2. An ice hole plug comprising an elongated frusto-conically shaped imperforate container having a closed lower end portion with a bottom and an open upper end portion, said container tapering inwardly and downwardly, a perforate container having an open upper end portion, and means carried by said containers for releasably securing said containers together with the lower end portion of said imperforate container across the upper end portion of said perforate container in closing relation to the latter, the perforations in said perforate container being sufficiently small to prevent minnows from passing therethrough whereby minnows may be kept alive within said perforate container when the latter is so secured to said imperforate container while the latter is used as a plug in a hole in the ice covering a body of water, said means being comprised of an annular flange extending downwardly below the bottom of said imperforate container, locking elements carried by said flange and cooperative locking elements carried by said perforate container and constructed and arranged to engage said flange-carried locking elements when said closed lower end portion of said imperforate container and said open upper end portion of said perforate container are brought together in aligned relation and to cooperatively secure said containers to each other in such relation.

3. An ice hole plug comprising an elongated frusto-conically shaped imperforate container having a closed lower end portion with a bottom and an open upper end portion, said container tapering inwardly and downwardly, a perforate container having an open upper end portion, and means carried by said containers for releasably securing said containers together with the lower end portion of said imperforate container across the upper end portion of said perforate container in closing relation to the latter, the perforations in said perforate container being sufficiently small to prevent minnows from passing therethrough whereby minnows may be kept alive within said perforate container when the latter is so secured to said imperforate container while the latter is used as a plug in a hole in the ice covering a body of water, said means being comprised of an inwardly facing annular channel formed in the inner surface of the upper end portion of said perforate container, said channel having locking element passageways formed in its channel-defining-walls, and locking elements carried by the lower end portion of said imperforate container and extending outwardly therefrom, the relation between the diameter of the lower end portion of said imperforate container and the diameter of the open upper end portion of said perforate container being such that the former may be passed into the latter to close off the latter, said locking elements and passageways being so positioned that all of the former may register simultaneously with the latter to permit said elements to pass into said channel and lock said containers together when one is rotated relative to the other about its longitudinal axis.

References Cited in the file of this patent

UNITED STATES PATENTS

| | | |
|---|---|---|
| 685,736 | Atwell | Nov. 5, 1901 |
| 1,934,138 | Paul et al. | Nov. 7, 1933 |
| 2,663,533 | Keiser et al. | Dec. 22, 1953 |
| 2,799,146 | Meagher | July 16, 1957 |
| 2,877,595 | Steuart | Mar. 17, 1959 |